US012282350B2

(12) United States Patent
Kanoun

(10) Patent No.: US 12,282,350 B2
(45) Date of Patent: Apr. 22, 2025

(54) BANDGAP CIRCUIT WITH NOISE REDUCTION AND TEMPERATURE STABILITY

(71) Applicant: SEMICONDUCTOR COMPONENTS INDUSTRIES, LLC, Phoenix, AZ (US)

(72) Inventor: Moez Kanoun, Waterloo (CA)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 325 days.

(21) Appl. No.: 17/935,967

(22) Filed: Sep. 28, 2022

(65) Prior Publication Data

US 2023/0288951 A1 Sep. 14, 2023

Related U.S. Application Data

(60) Provisional application No. 63/269,051, filed on Mar. 9, 2022, provisional application No. 63/373,244, filed on Aug. 23, 2022.

(51) Int. Cl.
*G05F 3/26* (2006.01)
*G05F 3/30* (2006.01)

(52) U.S. Cl.
CPC . *G05F 3/26* (2013.01); *G05F 3/30* (2013.01)

(58) Field of Classification Search
CPC . G05F 3/24; G05F 3/242; G05F 3/245; G05F 3/26; G05F 3/262; G05F 3/267;
(Continued)

(56) References Cited

U.S. PATENT DOCUMENTS 8,648,580 B2 * 2/2014 Wong .................... G05F 1/575 323/317
10,545,521 B2 * 1/2020 Ramos .................... G05F 1/575
(Continued)

FOREIGN PATENT DOCUMENTS

CN 112015226 A * 12/2020 ............ G05F 3/262
CN 112783256 A * 5/2021 ............ G05F 3/262

OTHER PUBLICATIONS

L. Chuang-ze, H. Ben-guang, G. Zhong-jie and W. Long-sheng, "High-Precision Bandgap Voltage Generation Method With Chopper Stabilization Technique," 2019 IEEE International Conference on Electron Devices and Solid-State Circuits (EDSSC), 2019, pp. 1-3, doi: 10.1109/EDSSC.2019.8754018.

*Primary Examiner* — Thienvu V Tran
*Assistant Examiner* — Shahzeb K Ahmad
(74) *Attorney, Agent, or Firm* — Polansky & Associates, P.L.L.C.; Paul J. Polansky; Nathan H. Calvert

(57) ABSTRACT

A bandgap reference circuit includes a complimentary to absolute temperature (CTAT) current generator providing a CTAT current with a source degeneration resistor, and a proportional to absolute temperature (PTAT) current generator providing a PTAT current. The PTAT current generator includes a first branch with a source degeneration resistor, a first p-type metal-oxide semiconductor (PMOS) transistor, and a first n-type metal oxide semiconductor (NMOS) transistor, a resistor, and a diode-connected transistor. A second branch includes a source degeneration resistor, a second PMOS transistor, a second NMOS transistor, and a diode-connected transistor. The second branch coupled to the first branch in a current mirror configuration. A chopper circuit alternately couples drain terminals of the first and second PMOS transistors in series to the remainder of their respective branches.

11 Claims, 6 Drawing Sheets

(58) Field of Classification Search
CPC ............... H03F 1/0205; H03F 2200/72; H03F 2200/129; G01K 7/015; G01K 7/183
See application file for complete search history.

(56) References Cited

U.S. PATENT DOCUMENTS

| | | | | |
|---|---|---|---|---|
| 10,983,547 | B1 * | 4/2021 | Ivanov | G05F 3/30 |
| 11,099,594 | B1 | 8/2021 | Kanoun | |
| 2007/0210784 | A1 * | 9/2007 | Sung | G05F 3/30 323/314 |
| 2007/0252573 | A1 * | 11/2007 | Tachibana | G05F 3/30 323/313 |
| 2008/0001585 | A1 * | 1/2008 | Bakkaloglu | H03F 1/086 323/280 |
| 2009/0051341 | A1 * | 2/2009 | Chang | G05F 3/30 323/313 |
| 2010/0295529 | A1 | 11/2010 | Consoer | |
| 2017/0115684 | A1 * | 4/2017 | Xu | G05F 3/30 |
| 2017/0221531 | A1 * | 8/2017 | Ono | G11C 5/147 |
| 2019/0007005 | A1 * | 1/2019 | Marques | H01L 27/0727 |
| 2020/0278713 | A1 * | 9/2020 | Hashemi | G11C 11/4074 |

* cited by examiner

BANDGAP CIRCUIT WITH NOISE REDUCTION AND TEMPERATURE STABILITY

This application claims the benefit of U.S. Provisional Patent Application No. 63/269,051 filed on Mar. 9, 2022 which is incorporated by reference in its entirety. This application also claims the benefit of U.S. Provisional Patent Application No. 63/373,244 filed on Aug. 23, 2022 which is incorporated by reference in its entirety.

FIELD OF THE INVENTION

The present disclosure relates to microelectronic circuits and more specifically to a bandgap reference circuit for generating a substantially temperature independent voltage or current.

BACKGROUND

A bandgap reference circuit is a functional block of an integrated circuit or system that can generate a voltage or current that does not change significantly with temperature. In other words, a bandgap reference can have a temperature coefficient (TC) that is relatively flat over a range of temperatures (e.g., 0-60 degrees C.). The relatively flat temperature coefficient may be generated by summing a current source that is proportional to absolute temperature with a current source that is complementary to absolute temperature. The temperature dependence of the proportional and complementary current sources, when combined, cancel each other to produce a reference current that is relatively insensitive to temperature. The current source that is proportional to absolute temperature and the current source that is complementary to absolute temperature may also be used to generate a reference voltage that is relatively insensitive to temperature.

However, especially with low power applications, known bandgap reference circuits still suffer from deleterious output noise and temperature variability. Low-power, current-mode bandgap references can require large value resistor(s) to generate an output voltage with a desired value, for example in near 1.2V. The output noise of a current-mode bandgap reference circuit is proportional to the resistance value. To decrease the output voltage noise of a current-mode bandgap, one may decrease the value of the resistance and thus increase the current value to maintain the output voltage. However, such solutions result in more power consumption. Another approach to decrease the output voltage noise of a current-mode bandgap may be to add a low-pass filter at the output. Nevertheless, the required capacitor value may be too high (i.e., in the range of 100s of nano-farads (nF)) which makes its integration on-chip unpractical in some cases. Moreover, to reduce low-frequency noise (i.e., flicker noise) in the current-mode bandgap, large area transistors may be used which in turn significantly increases the silicon area of the bandgap. Techniques are needed to improve the temperature variability of bandgap reference circuits, as well as their output noise. Further, techniques are needed to reduce the on-die area of bandgap reference circuits.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

Figure 1:
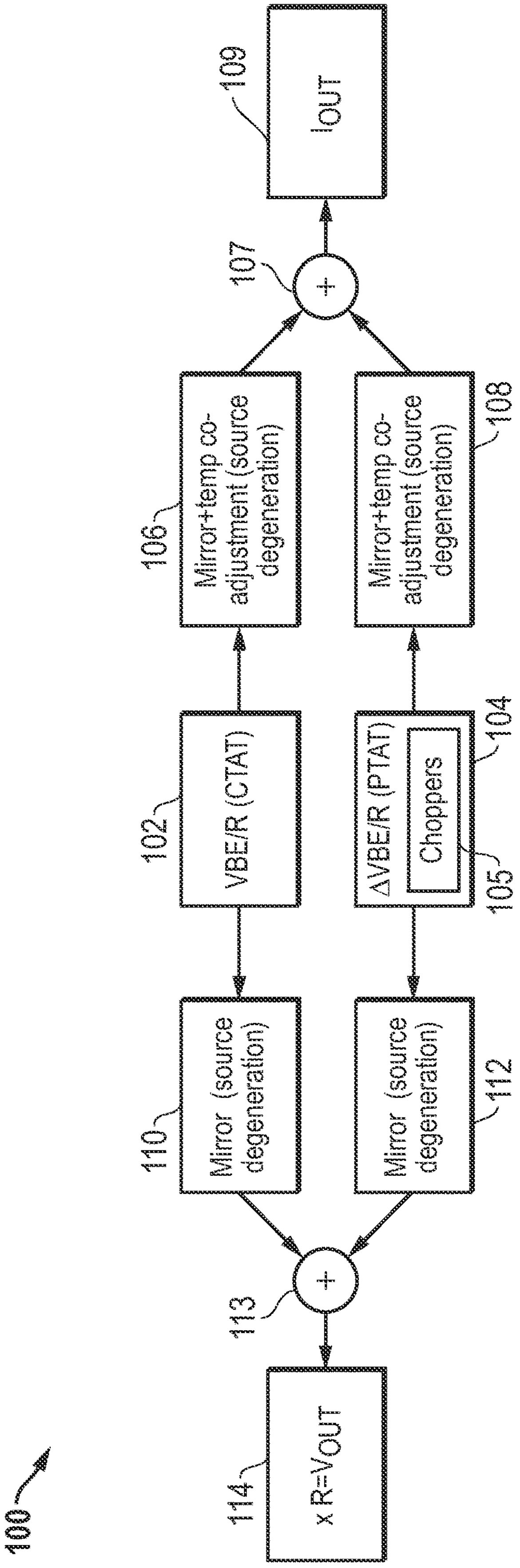
FIG. 1 illustrates in block diagram form bandgap reference circuit according to some embodiments.

FIG. 1 illustrates in block diagram form a bandgap reference circuit 100 according to some embodiments. Bandgap reference circuit 100 includes a complimentary to absolute temperature (CTAT) current generator 102, a proportional to absolute temperature (PTAT) current generator 104, a first CTAT current mirror 106, a first current-summing node 107, a first PTAT current mirror 108, a second CTAT current mirror 110, a second PTAT current mirror 112, a second current-summing node 113, a reference current output terminal 109, and a reference voltage output terminal 114.

CTAT current generator 102 generates a CTAT current, in this example based on a base-emitter voltage (VBE) of a transistor divided by a resistance R, and includes source degeneration using a source a source degeneration resistor, as further discussed below. The generated CTAT current is mirrored in first CTAT current mirror 106, which includes temperature co-adjustment and source degeneration. The generated CTAT current is also mirrored in second CTAT current mirror 110, which includes source degeneration.

PTAT current generator 104 generates a PTAT current, and includes chopper circuits 105 to reduce output voltage noise and improve current matching and temperature stability, as further discussed below. First PTAT current mirror 108 also includes temperature co-adjustment and source degeneration. First PTAT current mirror 108 mirrors the PTAT current and feeds it to current summing node 107. Second PTAT current mirror 112 also mirrors the PTAT current, and includes source degeneration. Second PTAT current mirror 112 feeds its mirrored current to current summing node 113.

Current summing node 107 is connected to an output 109 for providing a reference current $I_{OUT}$. Current summing node 113 is connected to an output resistor for creating a reference voltage $V_{OUT}$ at output terminal 114.

Figure 2:
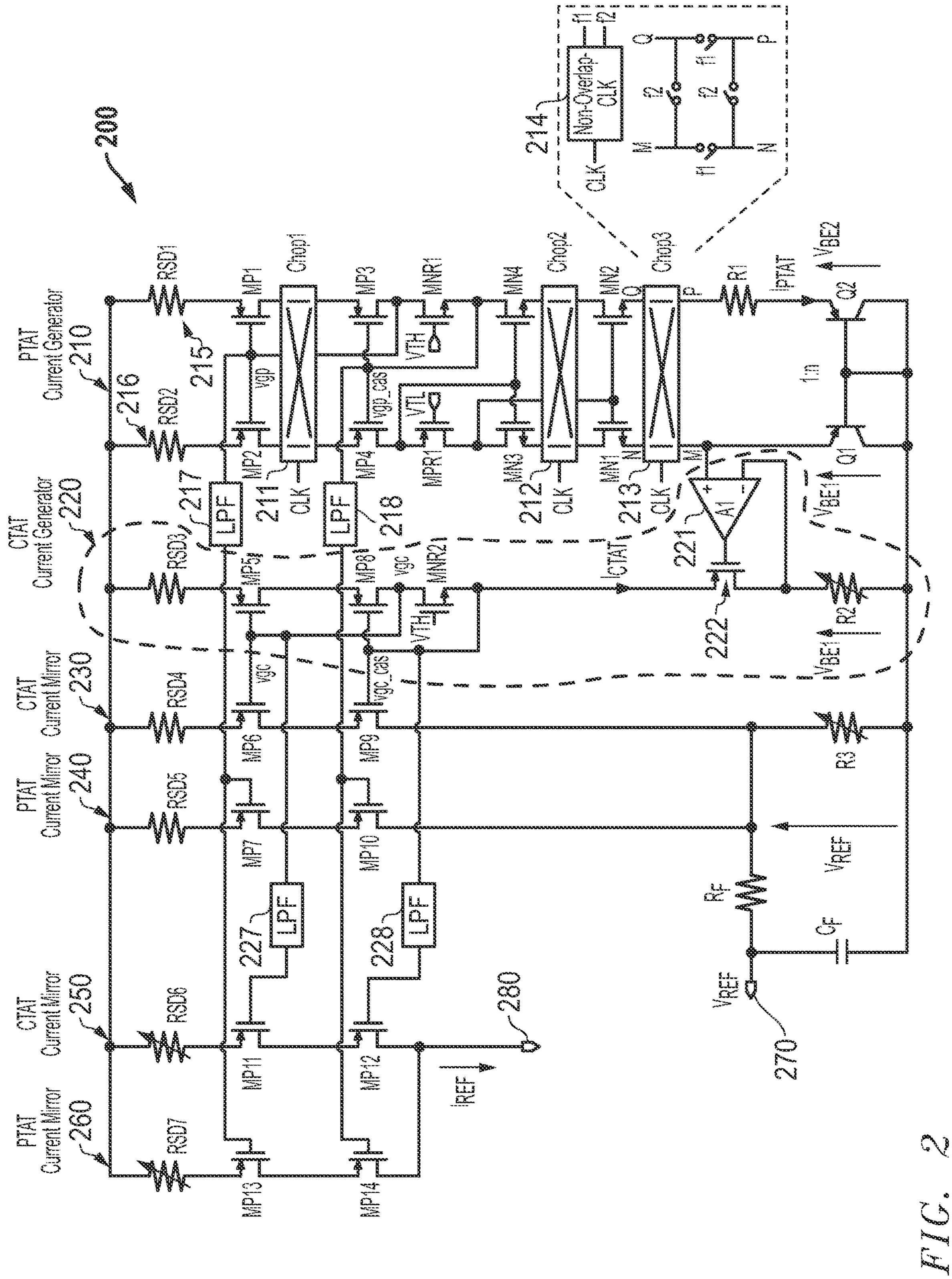
FIG. 2 illustrates in circuit diagram form a bandgap reference circuit according to an exemplary embodiment.

FIG. 2 is a schematic of a bandgap reference circuit according to an example embodiment. In this embodiment, current mirrors in a cascode configuration are employed to reduce or eliminate systematic component mismatches.

Bandgap reference circuit 200 includes a PTAT current generator 210, a CTAT current generator 220, a first CTAT current mirror 230, a first PTAT current generator 240, a second CTAT current mirror 250, a second PTAT current generator 260, a reference voltage output 270 providing a referenced voltage labeled "$V_{REF}$", and a reference current output 280 providing a reference current labeled "$I_{REF}$".

PTAT current generator 210 includes two branches 215 and 216 functioning as a current mirror with source degeneration. PTAT current generator 210 includes source degeneration resistors RSD1 and RSD2, a PTAT current generator input PMOS transistor MP1, a PTAT current generator output PMOS transistor MP2, a chopper circuit 211, cascode PMOS transistors MP3 and MP4, an NMOS transistor MNR1, a PMOS transistor MPR1, two NMOS cascode transistor MN1 and MN2, a chopper circuit 212, two NMOS bias transistors MN1 and MN2, a chopper circuit 213, a resistor R1, and two bipolar junction transistors (BJTs) Q1 and Q2.

Generally, PTAT current generator 210 generates a PTAT current "$I_{PTAT}$" through transistor Q2 and mirrors that current in transistor Q1. Referring to the two branches 215 and 216, source degeneration resistor RSD1 is connected between an upper rail voltage and a source terminal of a PMOS transistor MP1, and source degeneration resistor (RSD2) is connected between the upper rail voltage and a source terminal of a PMOS transistor MP2. PMOS transistors MP1 and MP2 have their gates connected to each other. Chopper circuit 211 alternately connects the drain terminal of the PMOS transistor MP1 to the source terminals of MP3 and MP4 and connects the drain terminal of MP2 to the source terminals of MP4 and MP3. The drain of cascode PMOS transistor MP3 is connected to the gates of PMOS transistors MP1 and MP2.

NMOS transistor MNR1 has a drain connected to the drain of PMOS transistor MP3, and PMOS transistor MPR1 has a source connected to the drain of PMOS transistor MP4. NMOS transistor MNR1 and PMOS transistor MPR1 act as resistors (MOS in triode region), and may be replaced by resistors in some embodiments. NMOS transistor MNR1 and PMOS transistor MPR1 are employed in this embodiment and operated in a triode region in order to save die area. The gate of PMOS transistor MPR1 is driven by a tied-low voltage "VTL" to achieve the proper bias, and the gate of NMOS transistor MNR1 is driven by a tied-high voltage "VTH" for the same reason.

The drain of cascode NMOS transistor MN3 is connected to the gate of NMOS transistors MN1 and MN2, and the drain of cascode NMOS transistor MN4 is connected to the source of NMOS transistor MNR1. The gates of cascode NMOS transistors MN3 and MN4 are connected to the drain of transistor MP4. The source of cascode NMOS transistor MN3 is alternately connected to the drain of MN1 and to the drain of MN2 whereas MN4 is alternately connected to MN2 and MN1 using the chopper circuit 212. NMOS transistor MN1 and MN2 have their gates connected to the drain of PMOS transistor MPR1. The source of NMOS transistors MN1 is alternately connected to the emitter of transistor Q1 and to the resistor R whereas the source of MN2 is alternately connected the resistor R1 and the emitter of the transistor Q1 using the chopper circuit 213. The other terminal of resistor R1 is connected to the emitter of transistor Q2. Transistors Q1 and Q2 have their collector terminals and base terminals connected to the circuits ground or negative voltage rail in a diode arrangement. Transistors Q1 and Q2 may be replaced by NPN transistors in some embodiments.

Each of chopper circuits 211, 212, and 213 includes four switches which are driven with a clock signal "CLK" as depicted in the expanded view of chopper circuit 213 depicted on the right. Each chopper circuit 211, 212, and 213 in this embodiment includes four terminals labeled "M", "N", "P", and "Q". The clock signal CLK is fed to a non-overlap clock circuit 214 which produces two clock signals "f1" and "f2", which each drive two of the four switches in a non-overlapping fashion such that the switches driven by clock signal f1 are closed when the switches driven by clock signal f2 are open, and vice versa.

In operation, PTAT current generator 210 generates matching currents to bias transistors MN1 and MN2. Accordingly, a gate-source voltage ($V_{GS}$) of NMOS transistor MN1 can substantially match (e.g., equal) a gate-source voltage of NMOS transistor MN2. Current from MN1 generates a first base-emitter voltage $V_{BE1}$ across transistor Q1 and the (matching) current from MN2 generates a second base-emitter voltage, $V_{BE2}$, across transistor Q2. Transistors Q1 and Q2 may be sized differently. For example, Q2 may be 8 times the size of Q1. In this situation, the base-emitter voltage across each transistor may be different, and the PTAT current ($I_{PTAT}$) may be given as the difference in the base-emitter voltages ($\Delta V_{BE}$) divided by the resistance of R1.

Source degeneration resistors RSD1 and RSD2 improve (i.e., make more accurate) the mirroring of the PTAT current by reducing a random mismatch of the pairs of transistors. The PTAT current generator is in a cascode configuration to improve the mirroring of the PTAT current by reducing systematic mismatches. Additionally, the cascode configuration can boost an output impedance of the PTAT current generator 210. Random mismatches may include variations in device parameters (e.g., device length, channel doping, oxide thickness, etc.) due to random variations in the lithography and/or other processes used for fabricating the devices. Systematic mismatches, however, may still exist. Systematic mismatches may include variations in circuit operation due to the design (e.g., topology) and/or the layout of the circuit.

CTAT current generator 220 includes a source degeneration resistor RSD3, two PMOS transistors MP5 and MP8, an NMOS transistor MNR2, an amplifier 221, an PMOS transistor 222 and a resistor R2, all connected in series between the upper rail voltage and the lower rail voltage. The base-emitter voltage ($V_{BE1}$) of transistor Q1 is coupled to resistor R2 using amplifier 221, with an output connected to the gate of PMOS transistor 222. The first base-emitter voltage across resistor R2 generates a CTAT current "$I_{CTAT}$". While in this implementation, the transistor 222 is a p-type transistor, other transistor types may be used. For this implementation, the inverting input of the amplifier 221 is coupled to transistor Q1. The present disclosure is not limited to this configuration. For example, transistor 222 may be an n-type transistor, or the non-inverting input of the amplifier is coupled to transistor Q1.

PMOS transistor MP5 is connected in a cascode configuration with PMOS transistor MP8, with the gate of PMOS transistor MP5 connected to the drain of PMOS transistor MP8 at a node labeled "vgc". NMOS transistor MNR2 is connected between the drain of PMOS transistor MP8 and the source of transistor 222, and has its gate connected to the voltage VTH (tie high voltage) to bias it to act as a resistor. As discussed with respect to transistors MPR1 and MNR1, a resistor may be used in place of NMOS transistor MNR2. The source of NMOS transistor MNR2 is connected to the gate of PMOS transistor MP8 at a node labeled "vgc_cas".

CTAT current mirror 230 is connected to CTAT current generator 220 to mirror the CTAT current $I_{CTAT}$. CTAT current mirror 230 includes a source degeneration resistor RSD4, two PMOS transistors MP6 and MP9, and a resistor R3, all connected in series between the upper rail voltage and the lower rail voltage. The gate of PMOS transistor MP6 is connected to the gate of PMOS transistor MP5, and the gate of PMOS transistor MP9 is connected to the gate of PMOS transistor MP8, providing a current mirror of the cascode circuit of CTAT current generator 220.

Similarly, PTAT current mirror 240 is connected to PTAT current generator 210 to mirror the PTAT current $I_{PTAT}$. PTAT current mirror 240 includes a source degeneration resistor RSD5, and two PMOS transistors MP7 and MP10, and a resistor R3, all connected in series.

In this embodiment, CTAT current mirror 230 and PTAT current mirror 240 both feed their current through resistor R3 to create a reference voltage labeled "$V_{REF}$" proportional to the sum of their mirrored currents. Reference voltage $V_{REF}$ is provided at a node 270. A resistor $R_F$ is connected between a positive node of resistor R3 and node 270, and a capacitor $C_F$ is connected between node 270 and the lower voltage rail, providing low-pass filtering of reference voltage $V_{REF}$.

A second set of current mirrors, CTAT current mirror 250 and PTAT current mirror 260, are present in this embodiment to provide a reference current "$I_{REF}$" at node 280. While both a reference current and a reference voltage are made available as outputs in this embodiment, either one may be provided alone in other embodiments. CTAT current mirror 250 is connected to CTAT current generator 220 to mirror the CTAT current $I_{CTAT}$. CTAT current mirror 250 includes two lowpass filters (LPF's) 227 and 228, a source degeneration resistor RSD6, two PMOS transistors MP11 and MP12, connected in series between the upper rail voltage and an output terminal 280. The gate of PMOS transistor MP11 is coupled to the gate of PMOS transistor MP5 through LPF 227. The gate of PMOS transistor MP12 is coupled to the gate of PMOS transistor MP8 through LPF filter 228.

PTAT current mirror 260 is connected to PTAT current generator 210 to mirror the PTAT current $I_{PTAT}$. PTAT current mirror 240 includes a source degeneration resistor RSD7, and two PMOS transistors MP13 and MP14 connected in series between the positive voltage rail and output terminal 280. The gate of PMOS transistor MP13 is coupled to the gate of PMOS transistor MP1 through a LPF 217. The gate of PMOS transistor MP14 is coupled to the gate of PMOS transistor MP3 through a LPF filter 218.

The mirrored PTAT and CTAT currents from CTAT current mirror 250 and PTAT current mirror 260 are combined as shown as reference current $I_{REF}$ which is fed to output terminal 280.

In operation, bandgap reference circuit 200 includes a CTAT current mirror using source degeneration resistors RSD5 and RSD4 to improve (i.e., make more accurate) the mirroring of the CTAT current by reducing a random mismatch of the opposing transistors in branches 215 and 216. The CTAT current mirror is in a cascode configuration (i.e., a cascode CTAT current mirror 220) to improve the mirroring of the CTAT current by reducing a systematic mismatch. Additionally, the cascode configuration can boost an output impedance of the CTAT current mirror.

Bandgap reference circuit 200 includes a set of variable resistors (e.g., R2, R3, RSD4, RSD5, RSD6, and RSD7) that can be adjusted (e.g., trimmed) to change a value of the reference voltage or reference current at a particular temperature, or a rate of change of the reference voltage or reference current over a range of temperatures.

A reduction of the output voltage noise of the current-mode bandgap is achieved in some embodiments using source degeneration on the current mirrors and chopping on the transistor devices contribute the most to the output voltage noise.

The source degeneration on the current also improves the matching performance and, especially in combination with the chopper circuits, and provides one or more of several advantages, as further discussed below. First, there is a reduction of the TC variability due to mismatch. Second, there is a reduction of ripples on the output voltage due to mismatch and the use of chopper circuits. Third, there is a reduction of the need to filter the output using large value capacitor. As a result, only a small filtering capacitor (CF) may be needed to filter the chopper glitches. Fourth, the bandgap reference circuit is made more suitable for low-power applications. Fifth, the noise is be reduced even when the output current is relatively low (on the order of nano-amperes (nA)). Sixth, the bandgap reference circuit does not require large area transistors to reduce the flicker noise. Seventh, the bandgap reference circuit generates a current reference with very low TC.

Figure 3:
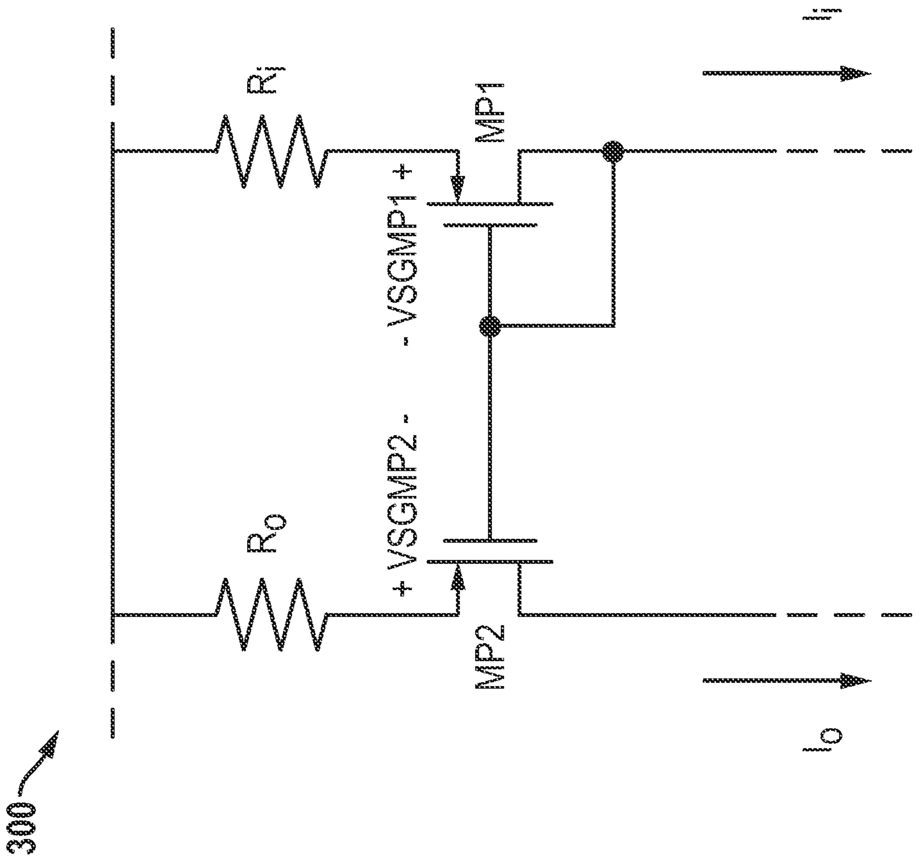
FIG. 3 illustrates in circuit diagram form a current mirror portion of a possible bandgap reference circuit.

FIG. 3 is a schematic of a current mirror portion of a possible bandgap reference circuit. The current mirror 300 includes an input resistor ($R_i$) coupled to a source terminal of a PMOS metal oxide semiconductor transistor MP1 and an output resistor $R_o$ coupled to a source terminal of a PMOS transistor MP2. When the input resistor $R_i$ and the output resistor $R_o$ are non-zero, the current mirror is said to have source degeneration (i.e., is source degenerated). In other words, a current mirror in a source degeneration topology includes resistors $R_i$ and $R_o$ on the source terminals of the transistors of the current mirror.

The matching performance of a current mirror can be highly dependent on its region of operation. For a current mirror without source degeneration (i.e., for a current mirror in which the input resistor $R_i$ and the output resistor $R_o$ are zero), the relative source-drain current error for a MOS transistor in the current mirror is given by the equations below.

$$\left(\frac{\sigma(\Delta I)}{I}\right)^2 = \left(\frac{\sigma(\Delta\beta)}{\beta}\right)^2 + \left(\frac{g_m}{I}\right)^2 \sigma^2(\Delta V_{TH}) \tag{1}$$

Where:

$$\sigma^2(\Delta V_{TH}) = \frac{A_{V_{TH}}^2}{WL} \tag{2}$$

and $$\left(\frac{\sigma(\Delta\beta)}{\beta}\right)^2 = \frac{A_\beta^2}{WL} \tag{3}$$

$$\frac{g_m}{I}$$

is related to the operating region of transistor (i.e., weak inversion, moderate inversion and strong inversion).

In the above equation, W and L are respectively the gate-width and the gate-length of the transistor, $Av_{TH}$ and $A_\beta$ the proportionality constants which are technology-dependent, $\beta=\mu C_{OX}W/L$, $\mu$ the carrier mobility, and $C_{OX}$ the gate-oxide capacitance per unit area.

The transconductance-to-current ratio ($g_m/I$) is the only parameter in equation (1) that is bias dependent while $\sigma(\Delta V_{TH})$ and $$\left(\frac{\sigma(\Delta\beta)}{\beta}\right)$$

depend on the technology and the transistor area (e.g., WL). The transconductance-to-current ratio is strongly related to the transistor operation. The transconductance-to-current ratio is high (e.g., maximum) value when the MOS transistor is in a weak inversion region, is lower when the MOS transistor is operated in a moderate inversion region and is still lower when the MOS transistor is operated in a strong inversion region.

For the current mirror without source degeneration (i.e., $R_o=R_i=0$) operating in the weak inversion region, the transconductance-to current ratio of the transistor can be expressed by the equations below.

$$g_m = \frac{I}{nV_T} \tag{4}$$

$$V_T \approx 26mV @ T = 300K \text{ and } n \approx 1.5 \Rightarrow \frac{g_m}{I} = \frac{1}{nV_T} \approx 25.6V^{-1} \tag{5}$$

To decrease the source-drain current error, the area (e.g., WL) of the transistor can be increased and the transconductance-to-current ratio can be reduced. The transconductance-to-current ratio can be reduced by decreasing the W/L ratio of the transistor to move the operating point from weak inversion towards strong inversion while keeping a large transistor area. Simply increasing the size of a transistor, however, can require more physical (die) area. Instead of these approaches, the disclosed current mirror is configured to decrease the transconductance-to-current ratio (and thus the relative source-drain current error) using source degeneration (i.e., $R_o>0$, $R_i>0$). When these input and output resistors are non-zero, the effective transconductance, $G_m$, can be expressed by the equation below.

$$G_m = \frac{g_m}{1 + g_m R_S} \tag{6}$$

Where $R_s$ is $R_o$ and/or $R_i$, if $R_s>>1/g_m$, then $G_m$ is approximately $1/R_s$. Using this approximation, the transconductance-to-current ratio can be given by the equation below, $$\frac{G_m}{I} = \frac{1}{R_S I}, \tag{7}$$

for $$\frac{G_m}{I} = 6.6V - 1(\text{for } R_S I \approx 150mV)$$

Source degeneration as used herein also reduces the output current noise in terms of noise and considering only the flicker noise. For simple current mirror, the output current noise PSD is:

$$\overline{I_{out}^2} = g_m^2 \overline{V_n^2} \tag{8}$$

For a current mirror with source degeneration the output current noise PSD is:

$$\overline{I_{out}^2} = \left(\frac{g_m}{1 + g_m R_E}\right)^2 \overline{V_n^2} \tag{9}$$

For the current-mode bandgap circuit of FIG. 2, the reference voltage may be obtained by creating a PTAT and a CTAT currents. These currents are mirrored and summed through a resistor R. The reference output voltage is then given by:

$$V_{ref} = (I_{PTAT} + I_{CTAT})R \tag{10}$$

For the sake of simplicity, $\overline{V_{n7}^2}$ and $\overline{V_{n6}^2}$ represent the total noise reported at the gate of MP7 and MP6. $\overline{V_{n7}^2}$ includes the core of CTAT noise contribution and the flicker noise of MP7 and $\overline{V_{n6}^2}$ the PTAT core contribution and the flicker noise of MP6.

The output voltage noise can be expressed as:

$$\overline{V_{refn}^2} = \left(g_{m7}^2 \overline{V_n^2} + g_{m6}^2 \overline{V_{n6}^2} + \frac{4Kt}{R} + \overline{I_{n7}^2} + \overline{I_{n6}^2}\right) R^2 \tag{11}$$

Where $\overline{I_{n7}^2}$ and $\overline{I_{n6}^2}$ represent the thermal noise of MP7 and MP6 respectively, and $\gamma$ is the channel length modulation parameter of MP7 and MP6, respectively:

$$(\overline{I_{n7}^2} = 4kT\gamma g_{m7} \text{ and } \overline{I_{n6}^2} = 4kT\gamma g_{m6}).$$

For low-power applications, in which the current is on the order of nano-amperes (nA), the resistor R has a value of tens of megaohms (MΩ) which leads to a high output voltage noise.

By adding a source degeneration on the current mirrors as shown in FIG. 2, the output noise is reduced to:

$$\overline{V_{refn}^2} = \left[\left(\frac{g_{m7}}{1 + g_{m7}R_{S7}}\right)^2 \overline{V_{n7}^2} + \left(\frac{g_{m7}}{1 + g_{m7}R_{S7}}\right)^2 \overline{V_{n6}^2} + \frac{4kT}{R} + \overline{I_{n7}^2} + \overline{I_{n6}^2}\right] R^2 \tag{12}$$

This addition further reduces the CTAT and PTAT core contribution in $\overline{V_{n6}^2}$ and $\overline{V_{n5}^2}$. By applying a chopper on MP1/MP2 and MN1/MN2, the circuit can also reduce $\overline{V_{n6}^2}$ and $\overline{V_{n7}^2}$ by reducing the core of PTAT contribution. Therefore, the use of chopper circuits in combination with the source degeneration resistors improves voltage noise performance dramatically.

Figure 4:
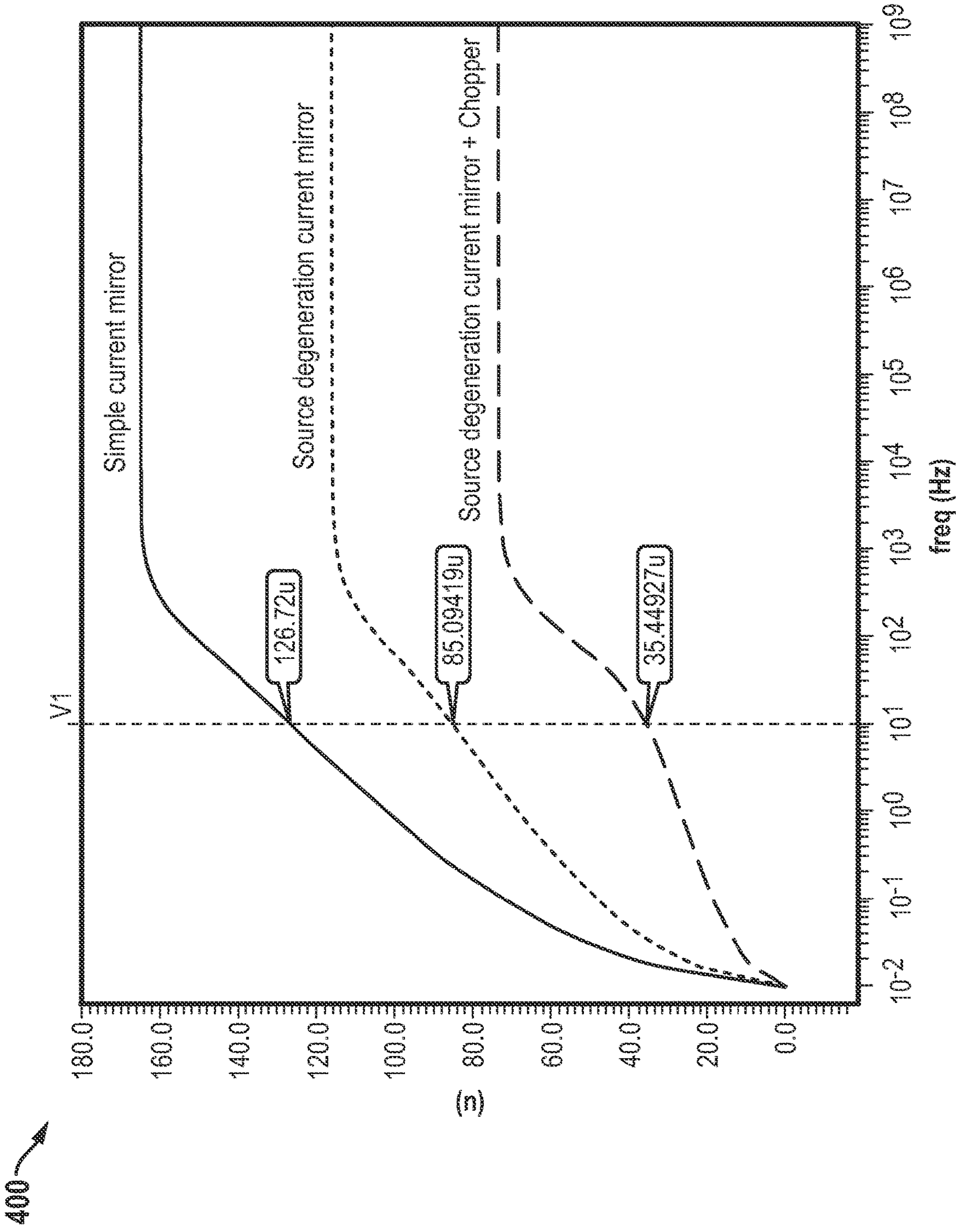
FIG. 4 shows a log-linear graph illustrating the integrated noise performances of the chopper stabilized current-mode bandgap reference circuit with source degeneration as shown in FIG. 2.

FIG. 4 shows a chart 400 illustrating the integrated noise performances of the chopper stabilized current-mode bandgap reference circuit with source degeneration as shown in FIG. 2. Voltage noise is shown in Volts root-mean-squared (RMS) for a simple current mirror implementation, a current mirror with source degeneration implementation, and a current mirror with source degeneration and chopper implementation of FIG. 2. The integrated noise of chopper stabilized bandgap reference with source degeneration is at least 3.5-fold lower than its simple current mirror implementation counterpart.

Figure 5:
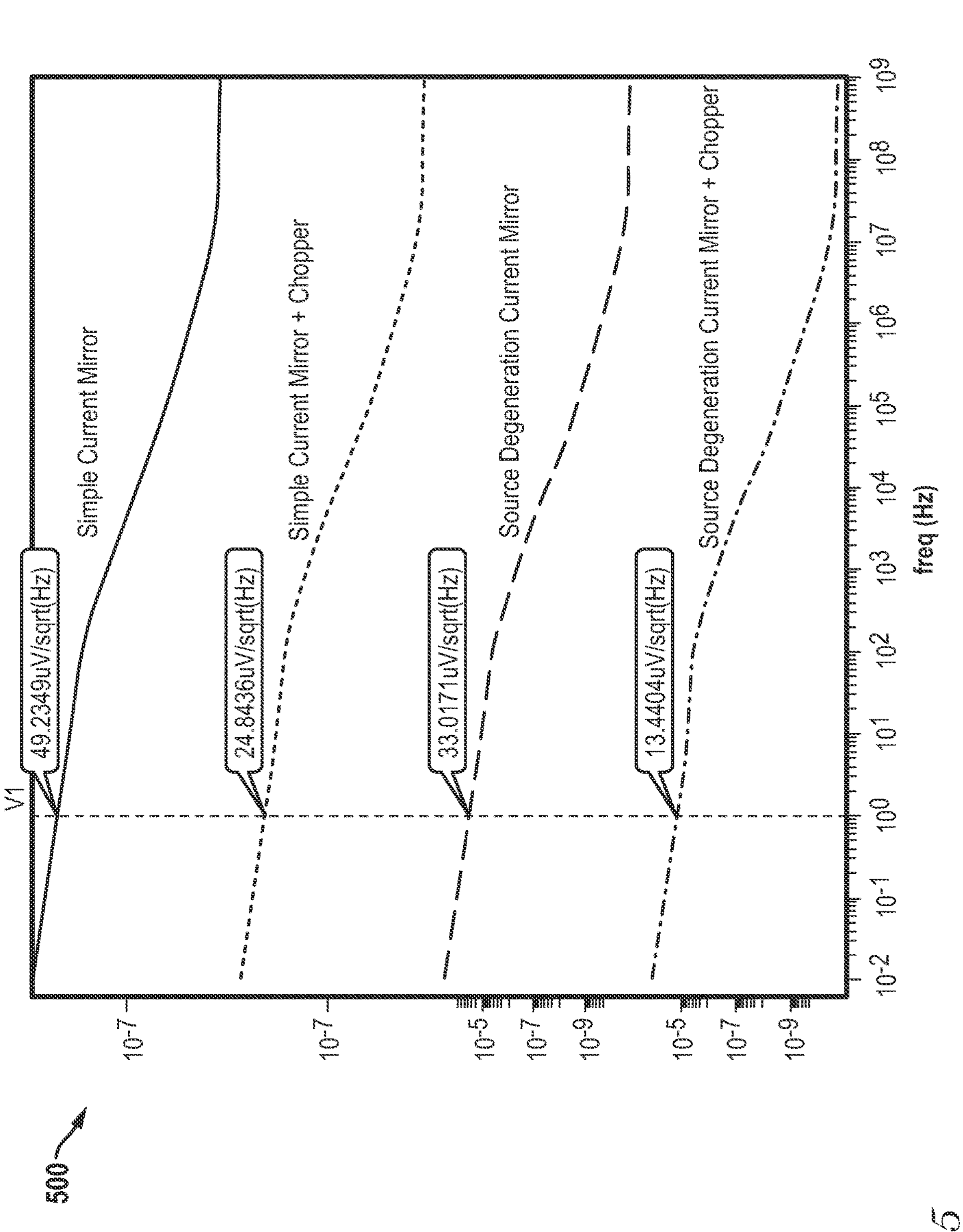
FIG. 5 shows a log-log graph illustrating the noise performance for the same embodiment (not integrated) in volts per square root Hertz (V/√Hz)

FIG. 5 shows a chart 500 illustrating the noise performance for the same embodiment (not integrated) in volts per square root Hertz (V/√Hz). Voltage noise is shown for a simple current mirror, a simple current mirror with chopper circuits positioned as in FIG. 2, a current mirror with source degeneration positioned as in FIG. 2, and the circuit of FIG. 2 which includes both source degeneration and choppers, as indicate by the labels. In the embodiment of FIG. 2, the combination of source degradation resistors and the chopper circuits operate to reduce output voltage noise by at least 66%, as measured in volts per square root Hertz (V/√Hz), as compared to the bandgap reference circuit of FIG. 2 implemented without the source degradation resistors and chopper circuits.

Figure 6:
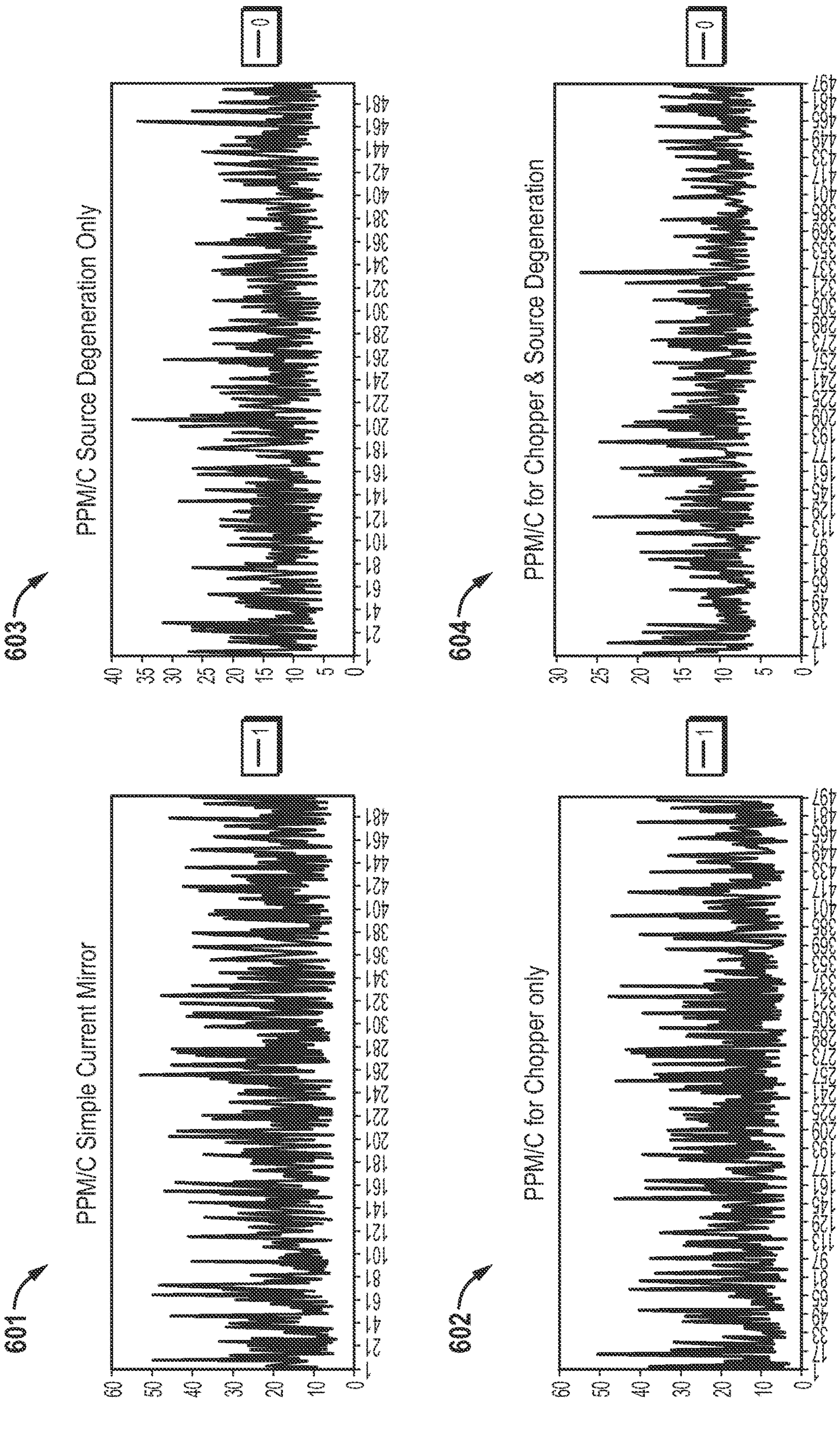
FIG. 6 shows a series of graphs depicting results of Monte Carlo simulations to evaluate temperature stability of the circuit of FIG. 2.

FIG. 6 shows a series of charts depicting results of Monte Carlo simulations to evaluate temperature stability of the circuit of FIG. 2. The charts show the simulated output voltage temperature variation expressed in parts-per-million per degrees C. (PPM/C) of 500 iterations. Chart 601 depicts simulation results for a simple current mirror implementation of FIG. 2. These results show a temperature variability with a PPM/C_STD (standard deviation) of 10.3. Chart 602 depicts simulation results for a current mirror with chopper circuits only (without source degeneration). These results show a temperature variability with a PPM/C_STD of 9.5. Chart 603 depicts simulation results for a current mirror with source degradation only. These results show a temperature variability with a PPM/C_STD of 5.4. Chart 604 depicts simulation results for the current mirror circuit as shown in FIG. 2, including chopper circuits and source degeneration. These results show a temperature variability with a PPM/C_STD of 3.5. As can be seen, the combination of chopper circuits and source generation has a synergistic improvement as compared to the either of these features alone. That is, in charts 601 and 602, the chopper circuit alone improved the results by 0.8 PPM/C, while the chopper circuit in combination with source degeneration in 604 improved the results by 1.9 PPM/C over source degeneration only results shown in chart 603, and by 6.8 PPM/C over the simple current mirror results shown in chart 601. In some embodiments, the source degradation resistors and chopper circuits operate to improve output voltage temperature stability of the CTAT and PTAT current mirrors by at least 60%, as measured in parts-per-million per degrees C. (PPM/C), as compared to the bandgap reference circuit without the source degradation resistors and chopper circuits.

Thus, various embodiments of a bandgap reference circuit, an IC including such a circuit, and a corresponding method have been described. The various embodiments provide a bandgap reference capability suitable for low-power applications (with current in nA) requiring high-accuracy and low noise. The techniques herein provide noise reduction of at least 3.5-fold compared to an implementation without choppers and source degeneration. They also provide improvement of the temperature stability (the PPM/C STD is 3 times smaller compared to an implementation without choppers and source degeneration). They also provide reduction of the output ripples by improving the matching performances due to the source degeneration. Furthermore, the circuits herein utilize a relatively small silicon area in achieving such results.

The above-disclosed subject matter is to be considered illustrative, and not restrictive, and the appended claims are intended to cover all such modifications, enhancements, and other embodiments that fall within the true scope of the claims.

Thus, to the maximum extent allowed by law, the scope of the present invention is to be determined by the broadest permissible interpretation of the following claims and their equivalents, and shall not be restricted by the forgoing detailed description.

What is claimed is:

1. A bandgap reference circuit, comprising:
- a complimentary to absolute temperature (CTAT) current generator providing a CTAT current and including a source degeneration resistor;
- a proportional to absolute temperature (PTAT) current generator providing a PTAT current and comprising:
  - a first branch comprising a source degeneration resistor, a first p-type metal-oxide semiconductor (PMOS) transistor, and a first n-type metal oxide semiconductor (NMOS) transistor, a resistor, and a diode-connected transistor;
  - a second branch comprising a source degeneration resistor, a second PMOS transistor, a second NMOS transistor, and a diode-connected transistor, the second branch coupled to the first branch in a current mirror configuration; and
  - a chopper circuit alternately coupling drain terminals of the first and second PMOS transistors to the remainder of their respective branches;
- a first current mirror coupled to mirror the CTAT current and including a source degeneration resistor;
- a second current mirror coupled to mirror the PTAT current and including a source degeneration resistor;
- an output configured to combine the mirrored CTAT and PTAT currents to provide a reference current;
- a first lowpass filter coupling gates of the first and second PMOS transistors of the PTAT current generator to a gate of a PMOS transistor in the second current mirror; and
- a second lowpass filter coupling a gate of a PMOS transistor in the CTAT current generator to a gate of a PMOS transistor of the first current mirror.

2. The bandgap reference circuit of claim 1, wherein the PTAT current generator further comprises:
- a third PMOS transistor in the first branch with a source alternately coupled to the first PMOS transistor in a cascode configuration or to a drain of the second PMOS transistor depending on a phase of the chopper circuit; and
- a fourth PMOS transistor in the second branch with a source alternately coupled to the first PMOS transistor in a cascode configuration or to a drain of the second PMOS transistor depending on a phase of the chopper circuit.

3. The bandgap reference circuit of claim 1, wherein the PTAT current generator further comprises:
- a third NMOS transistor with a source alternately coupled to a drain of the first NMOS transistor through a second chopper circuit; and
- a fourth NMOS transistor with a source alternately coupled to a drain of the second NMOS transistor through the second chopper circuit,
- the second chopper circuit alternately coupling the sources of the third and fourth NMOS transistors to each other.

4. The bandgap reference circuit of claim 1, further comprising:
- and an amplifier configured to couple a voltage of the diode-connected transistor of the second branch to a resistor in the CTAT current generator.

5. The bandgap reference circuit of claim 4, wherein:
- the source degeneration resistor of the first current mirror, the source degeneration resistor of the second current mirror, and the resistor in the CTAT current generator are adjustable to set a temperature coefficient of the reference current.

6. A method for generating a reference current, the method comprising:
- generating a proportional-to-absolute-temperature (PTAT) current using first and second branches of a PTAT current generator including source degeneration resistors;
- alternately coupling drain terminals of first and second PMOS transistors in the first and second branches to each other and in series to the remainder of their respective branches with a first chopper circuit, each of the first and second PMOS transistors having a respective source degeneration resistor;

generating a complementary-to-absolute-temperature (CTAT) current with a CTAT current generator;

generating a copy of the PTAT current using a PTAT current mirror with source degeneration, the generating including lowpass filtering a signal from gates of the first and second PMOS transistors of the PTAT current generator and feeding it to a gate of a PMOS transistor in the PTAT current mirror;

generating a copy of the CTAT current using a CTAT current mirror with source degeneration, the generating including lowpass filtering signal from a gate of a PMOS transistor in the CTAT current generator and feeding it to a gate of a PMOS transistor in the CTAT current mirror; and combining the copy of the PTAT current and the copy of the CTAT current to generate the reference current.

7. The method of claim 6, further comprising:

in the first branch, alternately coupling a drain of an NMOS transistor to a source of another NMOS transistor through a second chopper circuit;

in the second branch, alternately coupling a drain of an NMOS transistor to a source of another NMOS transistor through the second chopper circuit; and alternately coupling the sources of the NMOS transistors to each other through the second chopper circuit.

8. The method of claim 7, further comprising:

adjusting a source degeneration resistor of the PTAT current mirror and a source degeneration resistor of the CTAT current mirror to set a temperature coefficient of the reference current.

9. An integrated circuit comprising:

a bandgap reference circuit that is a functional block of the integrated circuit, comprising:

a complimentary to absolute temperature (CTAT) current generator providing a CTAT current and including a source degeneration resistor;

a proportional to absolute temperature (PTAT) current generator providing a PTAT current and comprising:

a first branch comprising a source degeneration resistor, a first p-type metal-oxide semiconductor (PMOS) transistor, and a first n-type metal oxide semiconductor (NMOS) transistor, a resistor, and a diode-connected transistor;

a second branch comprising a source degeneration resistor, a second PMOS transistor, a second NMOS transistor, and a diode-connected transistor, the second branch coupled to the first branch in a current mirror configuration; and a chopper circuit alternately coupling drain terminals of the first and second PMOS transistors to each other and in series to the remainder of their respective branches;

a first current mirror coupled to mirror the CTAT current and including a source degeneration resistor;

a second current mirror coupled to mirror the PTAT current and including a source degeneration resistor;

an output configured to combine the mirrored CTAT and PTAT currents to provide a reference current;

a first lowpass filter coupling gates of the first and second PMOS transistors of the PTAT current generator to a gate of a PMOS transistor in the second current mirror; and a second lowpass filter coupling a gate of a PMOS transistor in the CTAT current generator to a gate of a PMOS transistor of the first current mirror.

10. The integrated circuit of claim 9, wherein the PTAT current generator further comprises:

a third PMOS transistor in the first branch with a source alternately coupled to the first PMOS transistor in a cascode configuration or to a drain of the second PMOS transistor depending on a phase of the chopper circuit; and a fourth PMOS transistor in the second branch with a source alternately coupled to the first PMOS transistor in a cascode configuration or to a drain of the second PMOS transistor depending on a phase of the chopper circuit.

11. The integrated circuit of claim 9, wherein the PTAT current generator further comprises:

a third NMOS transistor with a source alternately coupled to a drain of the first NMOS transistor through a second chopper circuit; and a fourth NMOS transistor with a source alternately coupled to a drain of the second NMOS transistor through the second chopper circuit, the second chopper circuit alternately coupling the sources of the third and fourth NMOS transistors to each other.

* * * * *